Jan. 25, 1944.    J. T. FEENEY    2,339,848
EXPLOSION ENGINE
Filed April 29, 1942    2 Sheets-Sheet 1
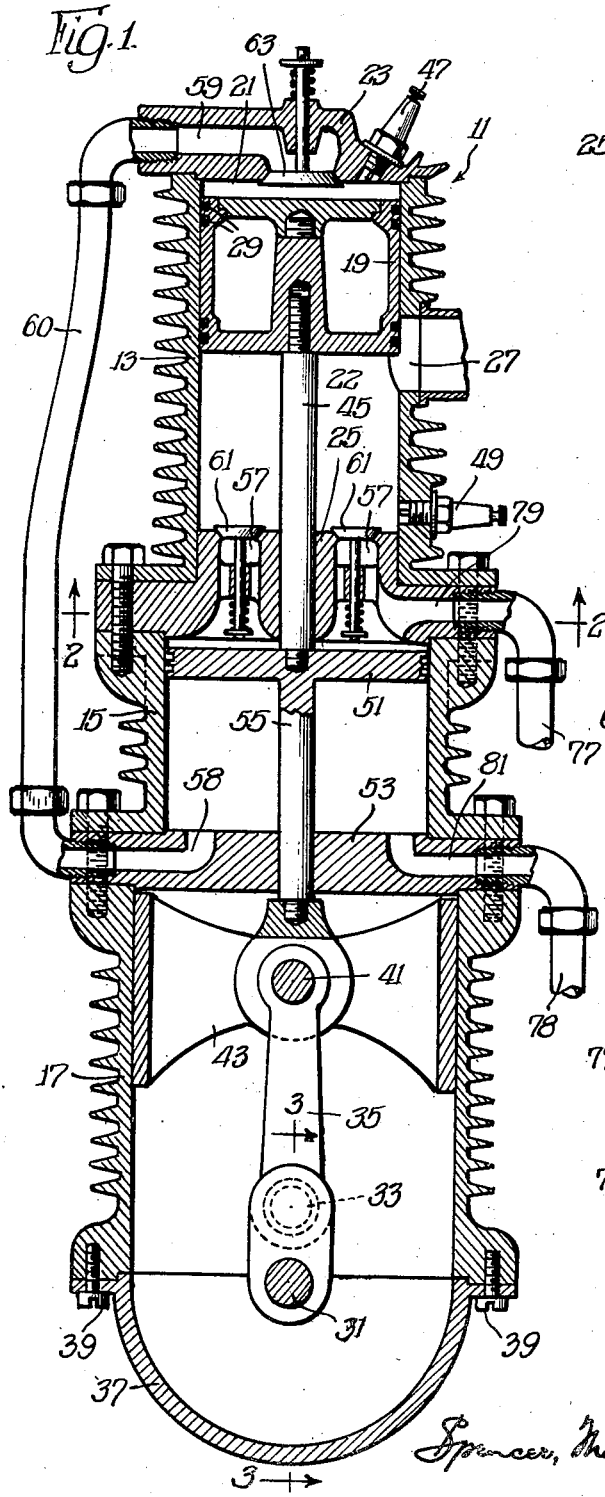
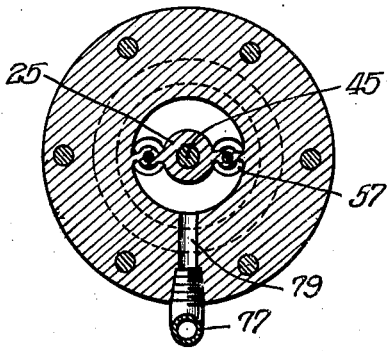
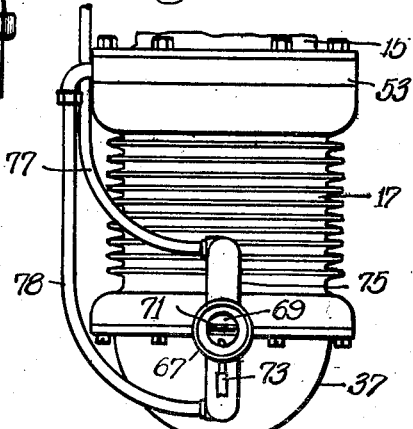
INVENTOR:—
Jack T. Feeney,
BY
Spencer, Marzall, Johnston & Cook
ATTYS.

Jan. 25, 1944. J. T. FEENEY 2,339,848
EXPLOSION ENGINE
Filed April 29, 1942 2 Sheets-Sheet 2
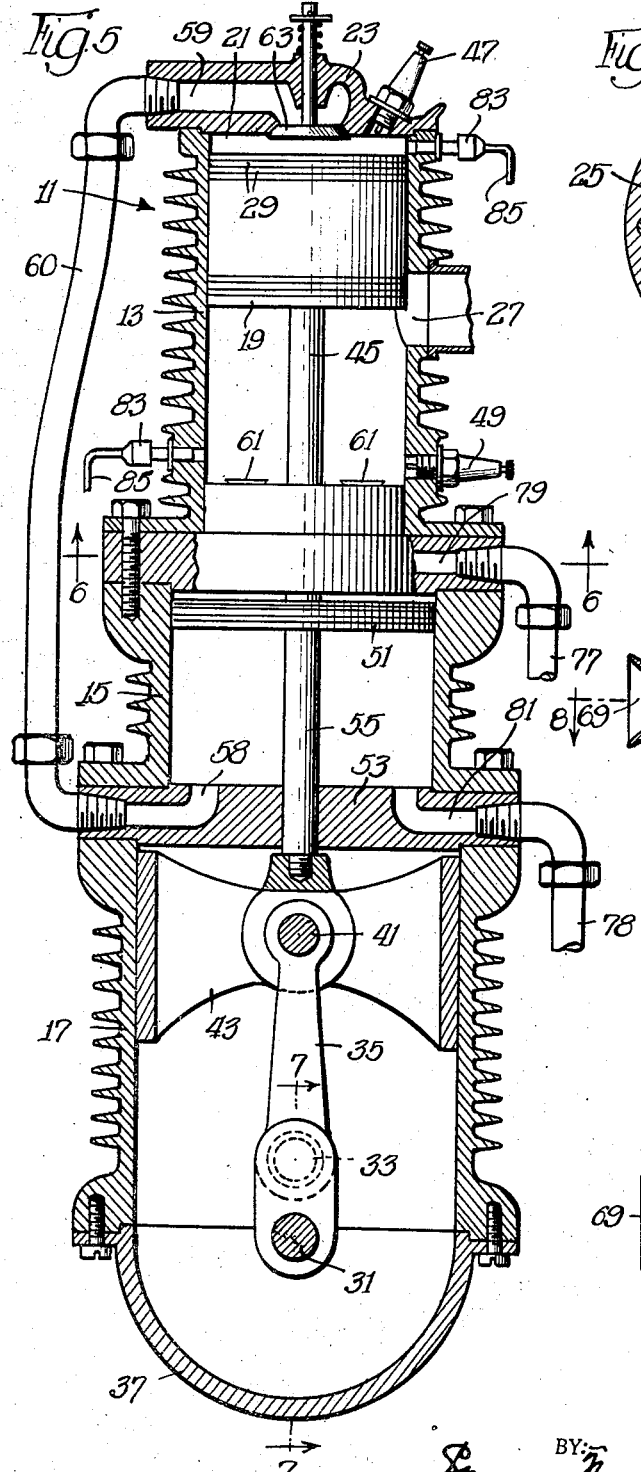
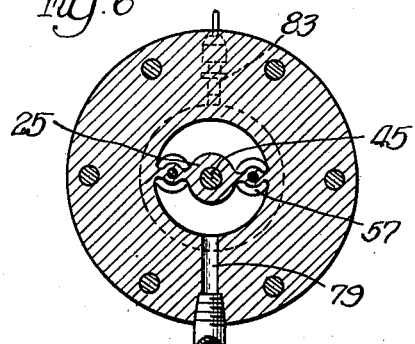
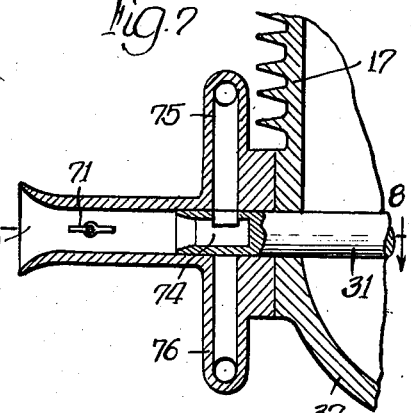
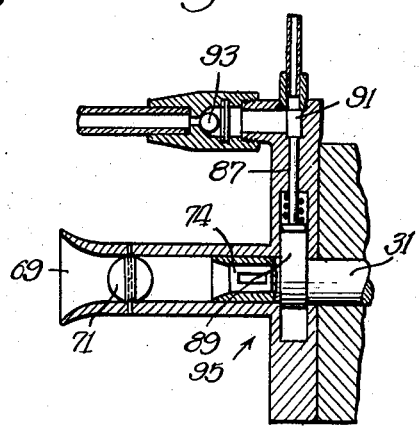
INVENTOR:-
Jack T. Feeney,
BY: Spencer, Marzall, Johnston & Cook.
attys Patented Jan. 25, 1944

2,339,848

UNITED STATES PATENT OFFICE 2,339,848

EXPLOSION ENGINE

Jack T. Feeney, Chicago, Ill.

Application April 29, 1942, Serial No. 441,017

13 Claims. (Cl. 123—62)

The invention relates in general to explosion engines and has more particular reference to internal combustion engines embodying cylinder means and a reciprocating piston wherein the piston receives a power impulse during each stroke of its reciprocating movement.

An important object of the present invention is to provide an internal combustion engine having a reciprocating piston and cylinder means forming combustion chambers on opposite sides of the piston, including pump means drivingly connected with the piston and actuated by piston movement to provide gas under pressure for delivery to the combustion chambers in timed relationship with piston movement; a further object being to provide a pressure differential valve means controlling the flow of fluid from the pump means to the combustion chambers; a further object being to provide pump means having a predetermined displacement in excess of the displacement of the piston of the engine, whereby to deliver compressed gas in excess quantities in said chambers; yet another object being to provide means for accurately regulating the quantity of gas so delivered in the combustion chambers.

Another important object of the invention is to provide means for delivering a measured quantity of gas under pressure to the combustion chamber of an internal combustion engine.

Another important object is to provide improved means for delivering carbureted fuel to the combustion chamber of an internal combustion engine.

Still another important object is to provide a double acting internal combustion engine having a reciprocating piston and cylinder means forming combustion chambers on opposite sides of the piston, in combination with a double acting compressor connected with the piston and having a displacement slightly larger than that of the piston, the opposite sides of the compressor being connected respectively with the combustion chambers on opposite sides of the piston, whereby to deliver gas thereto in timed relationship with the reciprocating movement of the piston in said combustion chambers.

Another important object is to provide a double acting internal combustion engine of unusual simplicity, comprising a minimum number of working parts whereby to reduce substantially the ratio of engine weight with respect to the power developing capacity of the engine, to reduce the size and cost of building the engine to a minimum, to increase operating reliability and efficiency, and to provide an engine having easy starting characteristics.

Another important object is to provide improved means for injecting fuel to the combustion chamber of an internal combustion engine.

These and numerous other important objects, advantages, and inherent functions of the invention will be fully understood from the following description, which, taken in connection with the accompanying drawings, discloses a preferred embodiment of the invention.

Referring to the drawings:

Figure 1 is a sectional view taken through an internal combustion engine embodying my present invention as arranged for carbureted fuel operation;

Figures 2 and 3 are sectional views taken substantially along the lines 2—2 and 3—3, respectively, in Figure 1;

Figure 4 is an elevational view of the lower portion of the engine shown in Fig. 1.

Figure 5 shows the engine as arranged for injected fuel operation;

Figures 6 and 7 are sectional views taken substantially on the lines 6—6 and 7—7, respectively, in Figure 5; and Figure 8 is a sectional view taken substantially along the line 8—8 in Figure 7.

To illustrate my invention, I have shown on the drawings an internal combustion engine 11 comprising casing means forming an engine cylinder 13, a compressor cylinder 15, and a cylinder crank case 17, preferably in coaxial alignment and in end to end relationship. In Figures 1-4 the engine is shown as arranged for operation on carbureted fuel, while in Figures 5-8 the engine is shown arranged for operation by fuel injection.

Within the cylinder forming portion 13 of the casing, a piston 19 is assembled for reciprocating movement. The casing portion 13 is provided with power cylinder heads 23 and 25 at its opposite ends, thereby forming combustion spaces 21 and 22 on opposite sides of the piston. The casing portion 13 is provided, also, with an exhaust port 27 opening through the side walls of the power cylinder midway between the heads 23 and 25. The piston under the driving impulse of explosive combustion of fuel alternately in the chambers 21 and 22, is caused to reciprocate between the heads 23 and 25 within the casing portion 13 past the exhaust port 27, thus communicating the same alternately with the chambers 21 and 22 for the delivery of exhaust gases from the chambers through the port 27 at the conclusion of the power stroke of the piston in each chamber. The piston may be provided with rings 29 for sealing engagement with the cylinder walls.

The piston is drivingly connected with a rotatable shaft 31 which, in the illustrated embodiment, is shown as a crank shaft having a throw or crank 33 drivingly connected with the piston through a connecting rod 35, so that reciprocating movement imparted to the piston by explosive forces made effective in the combustion chambers 21 and 22 may be applied to turn the shaft 31. The shaft 31 is suitably journaled in bearings formed in the crank case, the lower end of which is closed by means of a pan 37 secured to the crank case portion 17 in any suitable fashion, as by means of the holding bolts 39.

As shown, the connecting rod 35 is secured by means of a wrist pin 41 to a reciprocating head 43 which is slidingly supported within the crank case; and the head 43 is connected with the piston 19 through stem means 45 extending through and slidingly supported by the cylinder head 25.

The cylinder and piston 19 thus, in both embodiments, constitute an internal combustion engine in which power is delivered to move the piston in one direction by the explosive combustion of fuel in the chamber 21, and to move the piston in the opposite direction by the explosive combustion of fuel in the chamber 22, ignition of the fuel taking place alternately in the chambers 21 and 22 so that the piston receives a power impulse at the commencement of and during each piston stroke. Ignition of fuel in the chambers 21 and 22 may be accomplished by means of spark plug or other igniting devices 47 and 49, which may be mounted, respectively, in the cylinder head 23 and in the casing portion 13 adjacent the cylinder head 25.

An important object of the present invention is to provide simplified pump means for delivering measured excess quantities of gas to the combustion chambers 21 and 22 at the instant when piston movement in the power cylinder opens the exhaust port 27, to thus effectively scavenge or blow out spent or exhaust gases. The embodiment illustrated in Figures 1-4 comprises an engine designed for operation using carbureted fuel, the fuel being delivered to the chambers in the form of a gas mixture of fuel carburized with air, and I provide means for delivering a measured quantity of carburized fuel alternately to each of the chambers 21 and 22 as the exhaust port is opened at the end of the power stroke to thus fill the chamber with carbureted fuel ready for compression and to sweep out all exhaust gases.

In Figures 5, 6, 7 and 8 is shown an engine designed for operation by fuel injection directly into the combustion space during the compression stroke of the piston, and in the fuel injection engine I use the same simplified pump means to delivered measured quantities of air under pressure through the combustion chambers for cooling and scavenging purposes and to fill the chambers with fresh air ready for compression and fuel injection. To this end the engine, whether designed for carburetor operation or for fuel injection operation, comprises a compressor which is preferably connected directly with the piston, said compressor, in the illustrated embodiment, comprising the casing portion 15 forming the cylinder of the compressor and a piston 51 reciprocable within the compressor cylinder and connected to the piston stem 45. The compressor cylinder may be conveniently formed by securing the casing portion 15 at one end directly to the head member 25, whereby said member forms a head not only for the engine cylinder, but also for the compressor as well. The other end of the casing portion 15 is provided with a head 53 and the compressor piston 51 is provided with a stem 55 which extends slidingly through the head 53 and is fastened on the head 43 in the crank case. The stem 45 of the engine piston extends through the cylinder head 25 and is secured to the compressor piston 51 in axial alignment with the stem 55 whereby the piston 19 of the engine, the piston 51 of the compressor and the head 43 are rigidly interconnected by the stems 45 and 55 and, through the connecting rod 35, to the shaft 31.

It will be noted that the stroke of the piston 19 is identical to the stroke of the piston 51, but that the area of the piston 19 is somewhat less than the area of the piston 51. The piston 51 and its enclosing cylinder 51 thus forms a double acting compressor having pumping chambers on opposite sides of the piston 51. One side of the compressor is connected by means of ports 57 in the head 25 with the combustion chamber 22. The other side of the compressor is connected through suitable conduit means with the combustion chamber 21, said conduit means including a duct 58 in the head 53 and opening into the compressor cylinder, a duct 59 in the head 23 and opening into the combustion chamber 21, and a pipe 60 interconnecting the ducts 58 and 59. As the pistons 19 and 51 move in one direction, the compressor will tend to force gas from its contracting pump chamber into the combustion chamber, which is expanding due to piston movement therein. When moving in the opposite direction, the compressor will tend to force gas into the other combustion chamber. Expansion of the power chambers is, of course, due to explosive pressure developed therein by the ignition and combustion of fuel therein during the power stroke of the piston. The pressure in the power chamber during the initial portions of the power stroke of the piston is so high as to prevent delivery of gas from the compressor pump into the combustion chamber until the piston uncovers the exhaust port 27.

In order to prevent explosive pressures in the combustion chambers from backing into the compressor through the ports 57 and the duct means 59, said ports and duct means are provided with pressure differential valves 61 and 63, said valves opening toward the chambers 21 and 22 and away from the compressor, and being spring loaded to maintain the same normally in closed position. As the piston completes its power stroke under the forces liberated by gaseous combustion in one of the chambers, it will uncover the exhaust port to allow the exhaust gases to escape from such chamber. As soon as the piston uncovers the exhaust port 27, pressure in the combustion chamber thus connected with the exhaust port is immediately reduced to the pressure, usually atmospheric, which prevails at said port, thereby allowing the inlet valves connected with such combustion chamber to open under the pressure that has been developed in the compressor due to movement of the piston 51. Consequently, as soon as the outlet port 27 is opened or uncovered by the piston, a measured quantity of gas will be delivered into the combustion chamber and will sweep out all exhaust gases therein, at the same time filling the chamber with a measured quantity of fresh carburized fuel where the engine is in operation with a carburetor, or fresh air where operating as a fuel injected engine. Immediately thereafter the piston will reach the end of its stroke. At that instant combustion of compressed fuel is initiated in the other chamber to force the piston in the opposite direction, promptly closing the exhaust port and compressing the fresh gases in the chamber ready for ignition when the piston reaches the limit of its stroke in the opposite direction.

The foregoing cycle takes place alternately on opposite sides of the piston whereby the engine receives a power impulse at the beginning of and during each stroke, the power impulse being delivered by combustion of fuel alternately in the chambers 21 and 22.

It will be noted that the compressor, because of the larger displacement of its piston, will force an excess quantity of gas into the combustion chambers 21 and 22, thus ensuring complete scavenging of exhaust gases from the combustion chambers through the outlet port 27, and the engines of my present invention are designed so that the compressor will deliver exact measured charges of carburized fuel to the combustion chambers to cause complete scavenging.

Carburized fuel may be delivered, for compression by the piston 51, through a carburetor 65 of any suitable or preferred character. As shown in Figures 1-4, however, I prefer to utilize a carburetor comprising a shell 67 having an air intake manifold 69 communicating with a fuel mixing chamber 70 and fitted with a control valve 71 between the air inlet and the mixing chamber. The fuel jet 73 is provided in position opening into the mixing chamber 70 inwardly of the control valve 71. The mixing chamber 70 communicates through duct means 75 with one side of the compressor and through duct means 77 leading to the other side of the compressor. I provide distributor means in the form of a rotating valve 74 driven by the piston through the shaft 31. The valve is located in position interposed between the mixing chamber and the duct means 75 and 76. The valve 74 operates to deliver carburized fuel alternately to the opposite sides of the compressor through the duct means 75 and 76 which are connected, through suitable conduit pipes 77 and 78, respectively, to the inlet ports 79 and 81 formed radially in the heads 25 and 53 in communication with the compressor cylinder on opposite sides of the piston 51.

The distributor valve 74 is operated in timed relationship with the movement of the pistons 19 and 51 whereby, as the piston of the compressor is moving to discharge carburized fuel from one of the compression chambers, the inlet duct connected thereto will be closed by the valve 74, while the other side of the compressor will operate as a suction pump to draw carburized fuel into the compressor, from the carburetor through the open valve 74, in position to be delivered thence during the succeeding stroke of the piston 51 into the other combustion chamber. The distributor means 74 thus operates to close the duct means 75 and 77, respectively, during the compressive movement of the piston 51 in the pump chambers with which said ducts connect.

As shown in Figures 5-8, the engine is provided with means for injecting fuel directly into the combustion chambers 21 and 22 when the piston 19 is at or near the top of its compression strokes in the chambers. To this end, fuel injectors 83 are mounted, preferably in the casing member 13, near the heads 23 and 25 in position to deliver fuel in the chambers 21 and 22. These injectors are connected through suitable conductor pipes 85, each with a fuel pump 87 comprising a plunger operated by a rotating cam 89 on the shaft 31. Each of the pumps 87 include a casing forming a pump chamber 91 in which the plunger 87 reciprocates, said chamber being connected through a check valve 93 with a source of fuel supply and being connected also, through a pipe 85, with one of the injectors 83.

The engine may be designed for high compression operation as a fuel injected engine of the Diesel type in which ignition is accomplished by heat of compression. In such case separate igniting devices 47 and 49 are unnecessary and may be omitted. The engine, however, may be used with igniting devices 47 and 49 whether it is designed as a high or as a low compression device.

It will be noted that the injector pumps 87 are operated alternately by the cam means 89 in timed relationship with the movement of the piston 19, so as to spray a predetermined quantity of fuel directly into the chambers 21 and 22 when the piston 19 is at or approaching the end of its compression strokes therein.

Where the engine is arranged for operation by fuel injection, the compressor is connected to deliver air through the ports 57 and the duct 59 into the combustion chambers when opened to the exhaust port 27 as heretofore described. To this end the compressor inlet ports 79 and 81 may be provided merely with one way valves permitting a flow of air therethrough in one direction into the pump chambers on opposite sides of the piston 51. I prefer, however, to connect the ports 79 and 81 with an air delivery structure 95 similar to the carburetor 65 insofar as the air induction features of the same are concerned, the difference between the carburetor 65 and the air induction device 95 being that the carburetor includes the fuel jet 73 which is omitted from the device 95. The induction device thus comprises the shell 67 forming an air intake manifold 69 fitted with a control valve or throttle 71 and communicating through duct means 75 and 76 with the pump chambers. The device 95 inculdes the rotating distributor valve 74 driven by the piston 19 through the shaft 31 and located between the air inlet manifold and the ducts 75 and 76, said valve 74 being opreable to deliver air alternately to the opposite sides of the compressor through the duct means 75 and 76 which are connected by the pipes 77 and 78, respectively, with the inlet ports 79 and 81; and it will be noted that as air is delivered to one side of the piston 51 through the valve 74, reverse flow of air from the other side of the piston 51 through the air inlet port will be prevented by the valve 74, which at such time seals the inlet port to such other side of the piston 51. It will be noted that the injector pumps 87 may be built into the frame means forming the air delivery device 95 to provide a combined air delivery and fuel pump structure.

It will be noted also that in both embodiments the delivery of gas through the compressor and into the combustion chambers 21 and 22 may be controlled or throttled by the operation of the valve 71 to cut down the air delivered through the valve 74 to the compressor pump. Throttling in this manner places a slight load on the compressor and I may avoid thus loading the compressor in throttling the flow of gas to the combustion chambers by eliminating the throttle valve 71 and providing a bypass connection between the air inlet ports 79 and 81, said bypass connection containing an adjustable valve of any suitable or preferred form, which may either be closed to accomplish full unthrottled operation, or progressively opened in order to accomplish any desired degree of throttling. This bypass connection may conveniently be applied between the pipes 77 and 78 or between the ducts 75 and 76.

Suitable provision may be made for lubricating the several working parts of the engine along conventional lines, as by providing for the delivery of lubricating oil from a suitable oil pump driven by the shaft 31 through pipes and ducts formed in the crank shaft 31, connecting rod 35, the stems 45 and 55, and in the walls 13, 15 and 17, in order to deliver lubricating oil to the working surfaces of the piston 19, the plunger 51, the stems 45 and 55, the valves 61 and 63, the head 43 and the crank shaft and connecting rod bearings.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An internal combustion engine comprising a reciprocating piston, means forming a power cylinder enclosing said piston, a head at each end of said cylinder enclosing a combustion chamber therein at each of the opposed ends of the piston, said heads being formed each with an inlet port to the combustion chamber enclosed thereby, a compressor pump drivingly connected to the piston externally thereof, and duct means connecting the compressor pump with the port in each head whereby to deliver gas from the compressor to said chambers.

2. An internal combustion engine comprising a reciprocating piston, means forming a power cylinder enclosing said piston, a head at each end of said cylinder enclosing a combustion chamber therein at each of the opposed ends of the piston, said heads being formed each with an inlet port opening upon the combustion chamber enclosed thereby, said piston being connected to a stem extending through the head at one end of the cylinder, a compressor pump drivingly connected to said stem, and duct means connecting the pump with a port in each head.

3. An internal combustion engine comprising casing means forming a power cylinder and a pump cylinder in coaxial alignment and in abutting end to end relationship, means forming a common head between the abutting ends of said cylinders, a power cylinder head and a pump cylinder head, respectively, at the ends of said power and pump cylinders remote from said common head, a reciprocating piston in said power cylinder forming a combustion chamber in said power cylinder between the piston and the common head, and another combustion chamber between the pistons and said power cylinder head, a reciprocating plunger in said pump cylinder forming a pump chamber in said pump cylinder between the plunger and the common head, and another pump chamber between the plunger and said pump cylinder head, a stem extending through and slidingly fitted in an opening in said common head, said stem drivingly connecting said piston and plunger, said head being formed with a duct therein connecting said pump and combustion chambers which are adjacent and on opposite sides of said common head, means forming a conduit connecting said other pump chamber with said other combustion chamber through said power cylinder head, and one-way valve means in said duct and in said conduit and opening towards said combustion chambers for controlling the flow of gas through said duct and conduit, respectively, in one direction only from the compressor to said combustion chambers.

4. An internal combustion engine as set forth in claim 3, wherein said common head is formed with a gas inlet duct therein opening outwardly of said casing means and communicating with one of said pump chambers, and said pump cylinder head has a gas inlet duct therein opening outwardly of said casing means and communicating with the other of said pump chambers.

5. An internal combustion engine as set forth in claim 3, wherein said common head is formed with a gas inlet duct therein opening outwardly of said casing means and communicating with one of said pump chambers, and said pump cylinder head has a gas inlet duct therein opening outwardly of said casing means and communicating with the other of said pump chambers, and valved gas delivery means connected with said gas inlet ducts.

6. An internal combustion engine as set forth in claim 3, wherein said common head is formed with a gas inlet duct therein opening outwardly of said casing means and communicating with one of said pump chambers, and said pump cylinder head has a gas inlet duct therein opening outwardly of said casing means and communicating with the other of said pump chambers, and valved gas delivery means operable in timed relation with the reciprocating movement of said plunger to admit gas alternately to said gas inlet ducts during successive strokes of said plunger.

7. An internal combustion engine comprising a reciprocating piston, means forming a power cylinder enclosing said piston and forming a combustion chamber therein at each of the opposed ends of the piston, a compressor pump comprising a pump cylinder, a plunger reciprocable in said pump cylinder and drivingly connected with said piston, the pump cylinder forming a pump chamber therein at each of the opposed ends of the plunger, means forming ducts connecting each of the pump chambers with a separate one of the combustion chambers, and gas inlet means connected to said pump chambers, said gas inlet means comprising a rotary distributor valve driven by said piston and operable alternately to open and close the gas inlet means to each pump chamber, the gas inlet means being open to one pump chamber while closed to the other.

8. An internal combustion engine comprising a reciprocating piston, means forming a power cylinder enclosing said piston and forming a combustion chamber therein at each of the opposed ends of the piston, a compressor pump comprising a pump cylinder, a plunger reciprocable in said pump cylinder and drivingly connected with said piston, the pump cylinder forming a pump chamber therein at each of the opposed ends of the plunger, means forming ducts connecting each of the pump chambers with a separate one of the combustion chambers, gas inlet means connected to said pump chambers, said gas inlet means comprising a rotary distributor valve driven by said piston and operable alternately to open and close the gas inlet means to each pump chamber, the gas inlet means being open to one pump chamber while closed to the other, and a carburetor connected to deliver a mixture of air and fuel through said valve to said pump chambers.

9. An internal combustion engine comprising a reciprocating piston, means forming a power cylinder enclosing said piston and forming a combustion chamber therein at each of the opposed ends of the piston, a compressor pump comprising a pump cylinder, a plunger reciprocable in said pump cylinder and drivingly connected with said piston, the pump cylinder forming a pump chamber therein at each of the opposed ends of the plunger, means forming ducts connecting each of the pump chambers with a separate one of the combustion chambers, gas inlet means connected to said pump chambers, said gas inlet means comprising a rotary distributor valve driven by said piston and operable alternately to open and close the gas inlet means to each pump chamber, the gas inlet means being open to one pump chamber while closed to the other, and a carburetor connected to deliver a mixture of air and fuel through said valve to said pump chambers, including controllable throttle means for regulating the delivery of fuel through said compressor to said combustion chambers.

10. An internal combustion engine comprising a reciprocating piston, means forming a power cylinder enclosing said piston and forming a combustion chamber therein at each of the opposed ends of the piston, a compressor pump comprising a pump cylinder, a plunger reciprocable in said pump cylinder and drivingly connected with said piston, the pump cylinder forming a pump chamber therein at each of the opposed ends of the plunger, means forming ducts connecting each of the pump chambers with each of the combustion chambers, and means operated in timed relation with piston movement in said power cylinder for injecting fuel into said combustion chambers.

11. An internal combustion engine comprising a reciprocating piston, means forming a power cylinder enclosing said piston and defining a combustion chamber at each of the opposed ends of the piston, a compressor pump drivingly connected to said piston, means forming ducts connecting the compressor pump with each of said combustion chambers, the displacement of said pump during a reciprocating cycle of the piston being sufficient to deliver a volume of gas to said chambers in excess of the volume displaced by the movement of the piston in both chambers, and throttle means for controlling the amount of gas delivered in said chambers during a reciprocating piston cycle.

12. An internal combustion engine comprising a reciprocating piston, means forming a power cylinder enclosing said piston and forming a combustion chamber therein at each of the opposed ends of the piston, a compressor pump comprising a pump cylinder, a plunger reciprocable in said pump cylinder and drivingly connected with said piston, the pump cylinder forming a pump chamber therein at each of the opposed ends of the plunger, means forming ducts connecting each of the pump chambers with each of the combustion chambers, and throttle means for controlling the amount of gas delivered from said pump chambers into said combustion chambers comprising a bypass connection controlled by a regulating valve connected between said pump chambers.

13. An internal combustion engine comprising a reciprocating piston, means forming a power cylinder enclosing said piston, a head at each end of said cylinder enclosing a combustion chamber therein at each of the opposed ends of the piston, said heads being formed each with an inlet port to the combustion chamber enclosed thereby, a compressor pump drivingly connected to the piston and arranged to operate externally thereof, and duct means connecting the compressor pump with the port in each head whereby to deliver gas from the compressor to said chambers.

JACK T. FEENEY.